United States Patent [19]

Gordon et al.

[11] Patent Number: 5,813,693
[45] Date of Patent: Sep. 29, 1998

[54] RELEASABLE ATTACHMENT FOR AIR BAG DEPLOYMENT DOOR

[75] Inventors: Gary G. Gordon, Southfield; Scott A. Kelley, Algonac; Andrew J. Smydra, Rochester, all of Mich.

[73] Assignee: TRW VechicleSafety Systems Inc., Lyndhurst, Ohio

[21] Appl. No.: 605,495

[22] Filed: Feb. 26, 1996

[51] Int. Cl.$^6$ .................................................. B06R 21/20
[52] U.S. Cl. ........................ 280/728.3; 24/297; 280/732; 403/408.1
[58] Field of Search .............................. 280/728.3, 728.1, 280/728.2, 731, 732; 403/408.1; 411/172, 174, 175, 508, 512; 24/297, 458

[56] References Cited

U.S. PATENT DOCUMENTS

| | | | |
|---|---|---|---|
| 2,616,142 | 11/1952 | Tinnerman | 24/458 |
| 3,988,808 | 11/1976 | Poe et al. | 24/297 |
| 4,250,299 | 2/1981 | Nagashima et al. | 403/408.1 |
| 4,431,355 | 2/1984 | Junemann | 411/508 |
| 5,031,930 | 7/1991 | Sato . | |
| 5,060,972 | 10/1991 | Satoh et al. . | |
| 5,150,919 | 9/1992 | Sakakida et al. . | |
| 5,176,482 | 1/1993 | Reinl | 403/408.1 |
| 5,211,421 | 5/1993 | Catron et al. . | |
| 5,354,094 | 10/1994 | Matano et al. . | |
| 5,380,037 | 1/1995 | Worrell et al. . | |
| 5,398,961 | 3/1995 | Rogers et al. . | |
| 5,403,034 | 4/1995 | Gans et al. . | |
| 5,451,074 | 9/1995 | Guitarini . | |
| 5,458,365 | 10/1995 | Rogers et al. . | |

OTHER PUBLICATIONS

Research Disclosure, Jan. 1995 entitled "Air Bag Door and Reaction Canister Assembly".
U.S. Hagen Patent Appln. entitled "Release Mechanism", Attorney Docket No. TRW(AP)2864, (Serial No. not available at this time).

*Primary Examiner*—Eric D. Culbreth
*Attorney, Agent, or Firm*—Tarolli, Sundheim, Covell, Tummino & Szabo

[57] ABSTRACT

An inflatable vehicle occupant protection device (20) is attached to a vehicle part (22). The protection device (20) is deployable, upon inflation, through a deployment opening (24) in the vehicle part (22). A cover (60) closes the deployment opening (24) prior to deployment of the protection device (20). The cover (60) moves away from the vehicle part (22) upon deployment of the protection device (20). Attachment devices (82, 300) releasably attach the cover (60) to the vehicle part (22) and comprise a clip (120, 302) which is attachable to one of the cover and the vehicle part. The one of the cover (60) and the vehicle part (22) has a mounting opening (86, 322) and a recess (88, 324) adjacent the mounting opening. The clip (120, 302) includes a retaining portion (152, 364) biased to be received in the recess (88, 324) to inhibit removal of the clip, an opening (162, 380) for alignment with the mounting opening (86, 322), and a resiliently deflectable portion (164, 382). The attachment devices (82, 300) also include a stud (122, 304) which is non-pivotally fixed to the other of the vehicle part (22) and the cover (60). The stud (122, 304) is releasably connectable with the clip (120, 302) and includes a body (180, 400) which is extendable through the mounting opening (86, 322) in the one of the cover (60) and the vehicle part (22). The clip (120, 302) is movable relative to the mounting opening (86, 322) in the one of the cover (60) and the vehicle part (22) to compensate for relative misalignment among the opening (162, 380) in the clip, the mounting opening and the stud (122, 304) during attachment of the cover to the vehicle part.

16 Claims, 5 Drawing Sheets

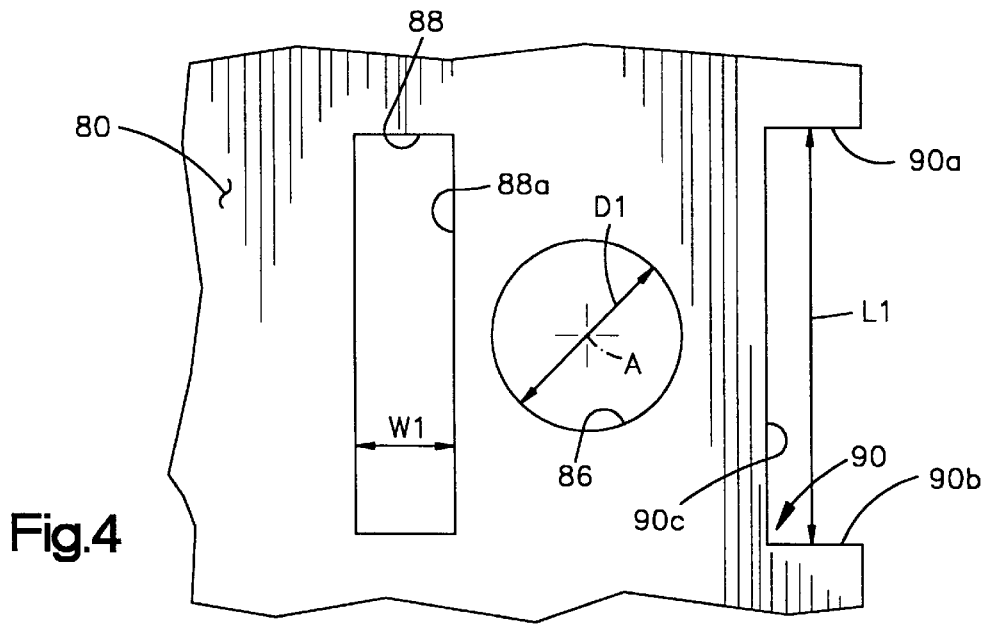
Fig.4
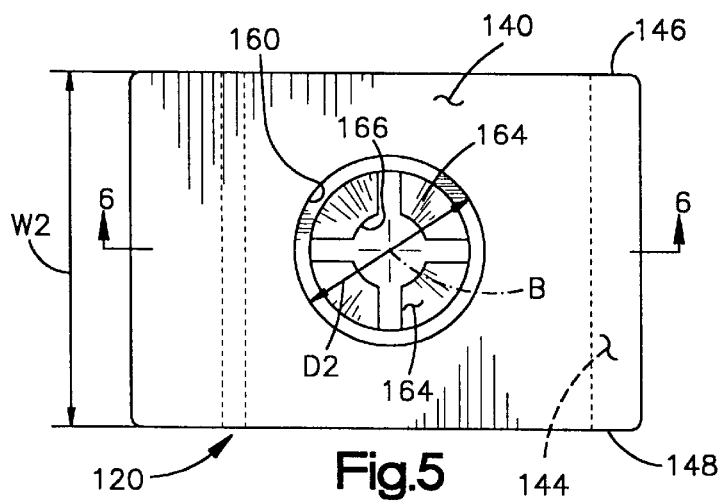
Fig.5
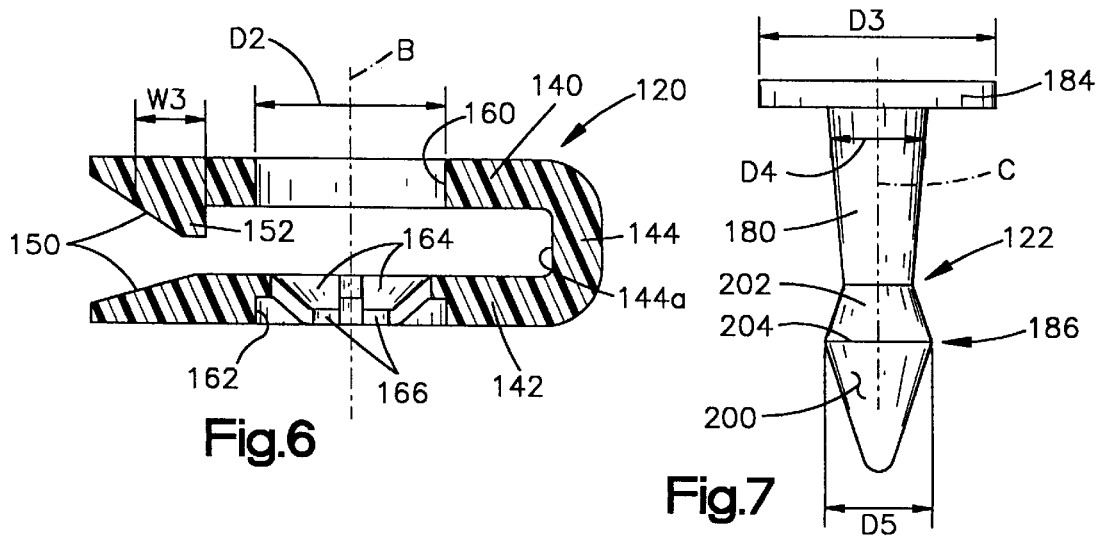
Fig.6
Fig.7

RELEASABLE ATTACHMENT FOR AIR BAG DEPLOYMENT DOOR

FIELD OF THE INVENTION

The present invention relates to an inflatable vehicle occupant protection device, and in particular to an apparatus which releasably attaches a deployment door to a vehicle part for concealing the protection device

BACKGROUND OF THE INVENTION

An inflatable vehicle occupant protection device, such as an air bag, helps protect a vehicle occupant upon inflation. The air bag inflates, for example, in response to a vehicle collision which is above a predetermined threshold and for which inflation of the air bag is desired.

The air bag is mounted within a vehicle part, such as a dashboard or instrument panel, and is inflatable through an opening in the vehicle part. A deployment door is secured by fasteners to the vehicle part to cover the opening and conceal the air bag. Upon inflation, the air bag applies a force against the deployment door, and the fasteners release the deployment door from the vehicle part so the air bag can extend through the opening.

SUMMARY OF THE INVENTION

The present invention is directed to an apparatus for helping to protect a vehicle occupant. The apparatus comprises an inflatable vehicle occupant protection device which can be mounted in a vehicle. The protection device is deployable, upon inflation, through a deployment opening in a vehicle part. A cover closes the deployment opening in the vehicle part prior to deployment of the protection device. The cover is movable away from the vehicle part upon deployment of the protection device. Attachment means releasably attaches the cover to the vehicle part.

The attachment means comprises a clip which is attachable to one of the cover and the vehicle part. The one of the cover and the vehicle part has a mounting opening and a recess adjacent the mounting opening. The clip includes a retaining portion biased to be received in the recess to inhibit removal of the clip from the one of the cover and the vehicle part. The clip also includes an opening for alignment with the mounting opening and a resiliently deflectable portion.

The attachment means also comprises a stud which is non-pivotally fixed to the other of the vehicle part and the cover. The stud is releasably connectable with the clip. The stud includes a body which is extendable through the opening in the clip and the mounting opening in the one of the cover and the vehicle part. The clip is movable relative to the mounting opening in the one of the cover and the vehicle part. Such relative movement compensates for relative misalignment among the opening in the clip, the mounting opening and the stud during attachment of the cover to the vehicle part.

Means at one end of the body of the stud is preferably fixed to the cover. A substantially nondeformable enlarged head is at an opposite end of the body. The enlarged head includes a leading surface for deflecting the resiliently deflectable portion of the clip during movement through the opening in the clip. A trailing surface of the enlarged head engages the resiliently deflectable portion after the leading surface is moved in a direction beyond the resiliently deflectable portion. The trailing surface and the resiliently deflectable portion cooperate to retain the stud within the clip until deployment of the protection device.

The clip is preferably attached to the vehicle part and includes a pair of substantially parallel legs connected by a base to form a substantially U-shaped member. The legs of the clip are to be disposed on opposite sides of the vehicle part. Each of the legs has an opening through which the stud can extend. Each of the legs includes a tapered end surface facing the other tapered end surface to deflect each leg away from the other during movement of the clip in a first direction to install the clip.

One of the legs of the clip has a projection forming the retaining portion which is receivable in the recess. The projection engages a surface defining the recess to inhibit movement of the clip in a second direction opposite the first direction of movement. The projection extends in a direction toward the other of the legs. The openings in the clip and the mounting opening preferably are circular. The vehicle part includes a slot formed on a side of the mounting opening opposite the recess. The base of the clip engages opposite ends of the slot to limit movement of the clip in a direction transverse to the first and second directions.

The stud has a cross-section which is circular in a plane normal to a longitudinal axis of the stud. The diameters of cross-sections of the stud gradually vary at locations along the stud between a maximum diameter and a minimum diameter The resiliently deflectable portion of the clip extends into the opening in a leg of the clip. The resiliently deflectable portion deflects upon the application of a first force by the leading surface of the stud to allow the stud to move in one direction through the opening in the clip. The resiliently deflectable portion deflects upon the application of a second force greater than the first force by the trailing surface of the stud to allow the stud to move in an opposite direction through the opening in the clip during deployment of the protection device.

The stud may include resiliently deflectable arms which deflect inward to allow movement of the stud in one direction through a stud receiving opening in the cover. The arms expand outward to inhibit movement of the stud in an opposite direction once the stud is in a predetermined position in the cover.

BRIEF DESCRIPTION OF THE DRAWINGS

Further features and advantages of the present invention will become apparent to one skilled in the art to which the present invention relates upon reading the following description of the invention with reference to the accompanying drawings, in which:

FIG. 4 is a plan view of a portion of the instrument panel of FIG. 3 with parts removed for clarity, taken approximately along the line 4—4 in FIG. 3;

FIG. 5 is a plan view of the clip of the attachment device of FIG. 3 with parts removable for clarity, taken approximately along the line 5—5 in FIG. 3;

FIG. 6 is a sectional view of the clip, taken approximately along the line 6—6 in FIG. 5;

FIG. 7 is a side view of a stud of the attachment device of FIG. 3;

DESCRIPTION OF PREFERRED EMBODIMENT

Figure 1:
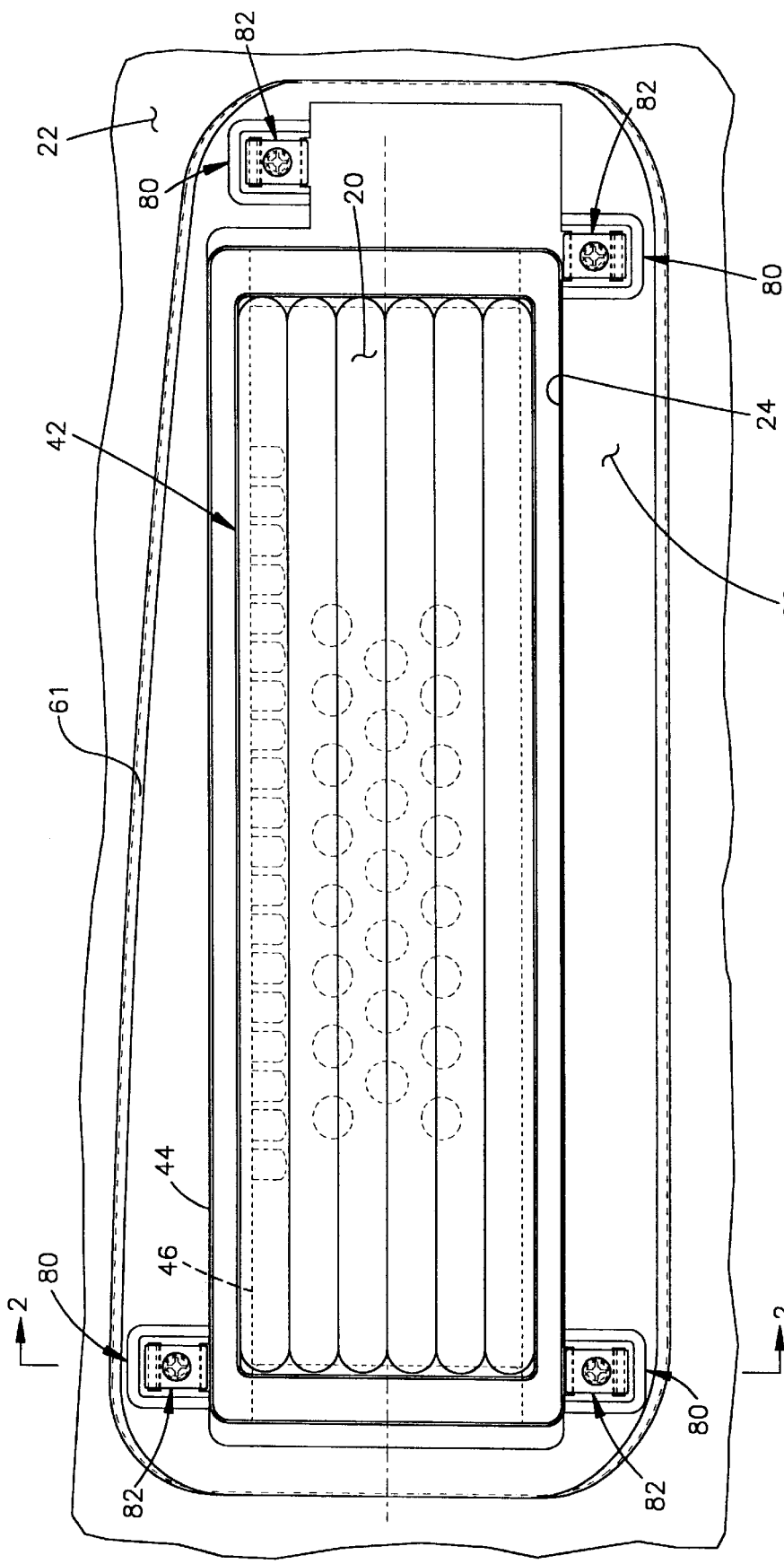
FIG. 1 is a schematic view of an air bag module mounted in an opening in a vehicle instrument panel which is closed by a deployment door.

An inflatable vehicle occupant protection device, commonly referred to as an air bag 20 (FIGS. 1 and 2), is located within an instrument panel 22 of a vehicle. A deployment opening 24 is formed in the instrument panel 22. The deployment opening 24 has a generally elongate rectangular shape, as viewed in FIG. 1. A surface portion of the instrument panel 22 extends around the deployment opening 24 to form a peripheral edge 26 of the instrument panel around the deployment opening.

The air bag 20 is part of a module 42 which is mounted inside a cavity 40 within the instrument panel 22. The module 42 includes a reaction can 44 and an inflator 46. The air bag 20 is attached to the reaction can 44 in a suitable manner. The inflator 46 is attached to the reaction can 44 and is located within a chamber defined by the reaction can. The inflator 46, upon actuation, supplies inflation fluid to inflate and deploy the air bag 20. The inflator 46 is actuated upon the occurrence of an event, such as a vehicle collision, which is greater than a threshold magnitude and for which inflation of the air bag 20 is desired.

Figure 2:
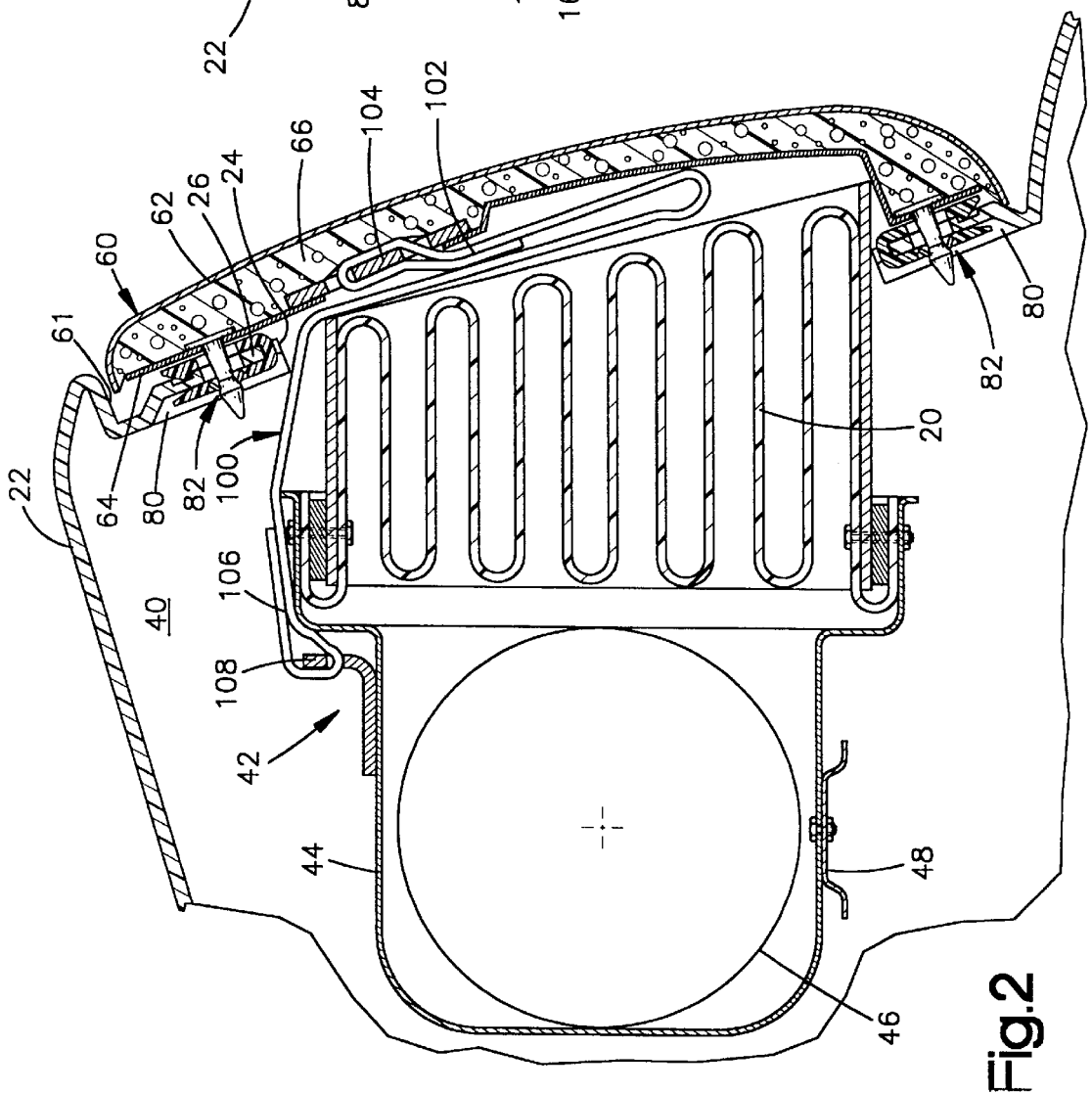
FIG. 2 is a sectional view of the air bag module and the deployment door attached to the instrument panel of FIG. 1, taken approximately along the line 2—2 in FIG. 1.

The deployment opening 24 is large enough to allow the module 42 to pass through the deployment opening into the cavity 40 inside the instrument panel 22 during installation of the module. The module 42 is attached to a frame part 48 of the vehicle located in the cavity 40. The air bag 20 inflates through the deployment opening 24. The air bag 20 is illustrated in FIG. 2 in its folded and stored condition prior to being inflated and deployed.

A deployment door or cover 60 (FIG. 2) is releasably attached to the instrument panel 22 and fits within a recess 61 in the instrument panel. The cover 60 is large enough to close the deployment opening 24 and conceal the air bag 20 when the cover is attached to the instrument panel 22. The cover 60 has substantially the same shape as the recess 61 in the instrument panel. The cover 60 overlaps the peripheral edge 26 of the instrument panel 22 and fits within the recess 61 (FIG. 2) in the instrument panel.

The cover 60 includes an outer surface 62 and an inner surface 64. A cushion portion 66 is located between the outer surface 62 and the inner surface 64. The cushion portion 66 is preferably made from a compressible polyurethane foam material. The outer surface 62 is preferably a surface of a relatively soft and easily deflectable plastic layer. The inner surface 64 is preferably a surface of a relatively thin sheet metal piece or a relatively rigid plastic layer.

Four mounting portions 80 are located in the peripheral edge 26 of the instrument panel 22. The mounting portions 80 are part of the peripheral edge 26 and are located essentially at the corners of the recess 61, as viewed in FIG. 1. Each mounting portion 80 is formed in a raised region 84 (FIG. 3) of the peripheral edge 26. Each mounting portion 80 receives a part of an attachment device 82 which releasably attaches the cover 60 to the instrument panel 22.

A mounting opening 86 (FIG. 4) extends through each mounting portion 80 and has a center A. The mounting opening 86 has a diameter D1. A recess 88 is formed in the mounting portion 80 and is spaced from the mounting opening 86. A slot 90 is formed in the end of the mounting portion 80 on a side of the mounting opening 86 opposite the recess 88. The recess 88 and the slot 90 have a length L1 and the recess has a width W1 in a direction perpendicular to the length.

Each of a pair of tether straps 100 (only one is seen in FIG. 2) is attached at one end 102 to a clip 104 on the inner surface 64 of the cover 60. Each of the tether straps 100 has an opposite end 106 attached to a clip 108 on the exterior of the reaction can 44. The tether straps 100 limit the distance that the cover 60 can move away from the instrument panel 22 upon deployment of the air bag 20 so the cover will not forcibly strike a vehicle occupant. The tether straps 100 also control the movement of the cover 60 during deployment of the air bag 20 so the cover is directed above the inflated air bag.

Figure 3:
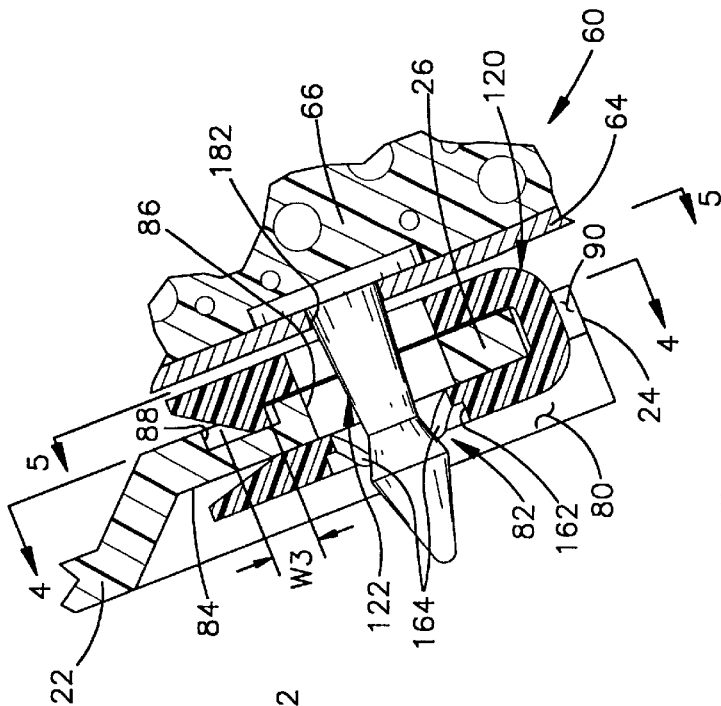
FIG. 3 is an enlarged sectional view of a portion of FIG. 2, illustrating an attachment device according to one embodiment of the invention.

Four of the attachment devices 82 (FIG. 1) are provided to attach the cover 60 releasably to the instrument panel 22 prior to deployment of the air bag 20. The attachment devices 82 are identical. The attachment device 82 shown in FIG. 3 is exemplary of all of the attachment devices and includes a clip 120 and a stud 122. The clip 120 is preferably attached to the mounting portion 80 of the instrument panel 22. The stud 122 is preferably attached to the cover 60 and is releasably connectable with the clip 120. It will be apparent that the clip 120 could be attached to the cover 60 and the stud 122 could be attached to the mounting portion 80 of the instrument panel 22.

The clip 120 includes a pair of generally parallel extending legs 140, 142 (FIG. 6). The legs 140, 142 are interconnected by a base 144. The clip 120 is molded from a plastic material which is relatively rigid but resiliently deflectable. Opposite sides 146, 148 (FIG. 5) of the base 144 may engage opposite ends 90a, 90b (FIG. 4) of the slot 90 in the mounting portion 80 to limit relative movement between the clip 120 and the mounting portion of the instrument panel 22 in a direction parallel to the length L1 of the slot 90. The clip 120 (FIG. 5) has a width W2 which is less than the length L1 of the slot 90 in the mounting portion 80. Thus, the clip 120 can move relative to the mounting portion 80 of the instrument panel 22 in a direction along the length L1 of the slot 90 to compensate for misalignment of parts of the cover 60 and the deployment opening 24 in the instrument panel 22.

The clip 120 includes tapered surfaces 150 on ends of the legs 140, 142. The tapered surfaces 150 face one another and force the legs 140, 142 to deflect resiliently in a direction away from one another when the clip 120 is installed on the mounting portion 80 of the instrument panel 22. The clip 120 is installed on the mounting portion 80 by moving the clip over opposite surfaces of the mounting portion. The tapered surfaces 150 of the clip 120 move into the slot 90 and along the mounting portion 80 in a direction away from the slot to the recess 88.

A projection 152 on the leg 140 enters the recess 88 in the mounting portion 80 when the base 144 of the clip 120 is moved into the slot 90 and the legs 140, 142 resiliently return to a neutral position as illustrated in FIG. 6. The projection 152 engages a surface 88a (FIG. 4) of the recess 88 to block removal of the clip 120 from the mounting portion 80. The projection 152 has a portion with a width W3 (FIG. 3) located in the recess 88 which is less than the width W1 (FIG. 4) of the recess. Thus, the clip 120 may move relative to the mounting portion 80 in a direction across the recess 88 away from surface 88a.

The leg 140 includes an opening 160 (FIGS. 5 and 6). The opening 160 has a diameter D2 which is substantially equal to the diameter D1 of the mounting opening 86. The leg 142 (FIG. 6) includes an opening 162 aligned with the opening 160 along an axis B. The opening 162 includes a diameter approximately equal to the diameter D2. The openings 160, 162 have centers on the axis B which is preferably aligned on the center A (FIG. 4) of the mounting opening 86.

Four retainer sections 164 (FIGS. 5 and 6) of the leg 142 extend inward into the opening 162. The retainer sections 164 are resiliently deflectable and have end surfaces 166. The retainer sections 164 extend at an acute angle in a downward direction relative to the axis B of the openings 160, 162, as viewed in FIG. 6. The retainer sections 164 are constructed to deflect downward easily and resist upward deflection, as viewed in FIG. 6.

The stud 122 (FIG. 7) is extendable through the openings 160 and 162 in the clip 120 and through the mounting opening 86 in the mounting portion 80 of the instrument panel 22, as illustrated in FIG. 3, when the clip is installed on the mounting portion. The stud 122 cooperates with the clip 120 to attach the cover 60 releasably to the instrument panel 22. The retainer sections 164 deflect easily downward when the stud 122 is moved downward through the openings 162, 160 of the clip 120, as viewed in FIG. 6. The angle at which the retainer sections 164 extend and the rigidity of the plastic material from which the clip 120 is molded require a relatively larger force to remove the stud 122 from the clip than is required to move the stud into the clip to the position illustrated in FIG. 3.

The stud 122 (FIG. 7) is an elongate member molded from a relatively rigid plastic material. The stud 122 is mounted to the cover 60 so it extends generally perpendicularly from the cover and is substantially not pivotable relative to the cover. The stud 122 includes a body 180 and a head 184, which is located at the upper end of the body 180, as viewed in FIG. 7. The body 180 is slightly tapered inward as it extends downward from the head 184 along a longitudinal central axis C of the stud 122, as viewed in FIG. 7. The body 180 has a largest diameter D4 adjacent the head 184, which has a diameter D3 that is greater than the diameter D4.

The stud 122 projects through an opening 182 in the inner surface 64 of the cover 60. The opening 182 in the inner surface 64 of the cover 60 has a diameter which is less than the diameter D3 of the head 184 of the stud 122, but greater than the largest diameter D4 of the body 180. The largest diameter D4 of the body 180 is also less than the diameter D1 of the opening 86 in the mounting portion 80 and the diameter D2 of the openings 160, 162 in the clip 120. The head 184 of the stud 122 engages the inner surface 64 of the cover 60, and the cushion portion 66 of the cover 60 is molded over the head 184 of the stud 122 to hold the stud in the cover 60.

The stud 122 also includes a substantially nondeformable head 186 disposed at an axially opposite end of the body 180 from the head 184. The head 186 includes a leading surface portion 200 and a trailing surface portion 202 connected at a transition portion 204. The transition portion 204 has a diameter D5 which is greater than the largest diameter D4 of the body 180 and less than the diameter D3 of the head 184. The diameter D5 is also less than the diameter D1 of the mounting opening 86 and the diameter D2 of the openings 160, 162 in the clip 120.

The leading surface portion 200 is tapered outward as it extends upward along the axis C, as viewed in FIG. 7. The leading surface portion 200 forms a substantially conical end portion of the stud 122. As the stud 122 is moved through the clip 120 and the mounting portion 80 of the instrument panel 22, the leading surface portion 200 cams the retainer sections 164 of the clip 120 radially outward and somewhat downward, as viewed in FIG. 6. The substantially conical shape of the leading surface portion 200 also centers the stud 122 relative to the retainer sections 164 of the clip 120. The retainer sections 164 of the clip 120 continue to deflect outward and downward as the leading surface portion 200 passes through the opening 162 in the clip 120.

When the transition portion 204 of the clip 122 passes the end surfaces 166 of the retainer sections 164, the retainer sections no longer deflect further outward and downward. Once the transition portion 204 of the stud 122 moves past the end surfaces 166 of the retainer sections 164, the retainer sections begin to deflect resiliently inward. The retainer sections 164 resiliently deflect inward and backward relative to the movement of the stud 122, to the position illustrated in FIG. 3.

Thus, as the cover 60 is moved into the recess 61 in the instrument panel 22 the studs 122 are inserted into the clips 120 attached to the mounting portions 80 of the instrument panel 22. This is a relatively simple operation that reliably attaches the cover 60 to the instrument panel 22 and allows the cover to be released upon deployment of the air bag 20 through the deployment opening 24 in the instrument panel. The clips 120 are movable relative to the mounting portion 80 of the instrument panel 22 to compensate for misalignment of the studs 122 on the cover 60 relative to the mounting opening 86 in the mounting portion of the instrument panel.

The end surfaces 166 of the retainer sections 164 engage the trailing surface portion 202 of the stud 122 to hold the stud in the clip 120 and the cover 60 in the recess 61 in the instrument panel 22. The studs 122 are held in the clips 120 during normal operation of the vehicle.

Upon the application of a removal force to each stud 122 which exceeds a predetermined force, the retainer sections 164 can be deflected to permit the stud 122 to be removed from the clip 120 and release the cover 60 from the instrument panel 22 during deployment of the air bag 20. When the air bag 20 is inflated, it exerts a force against the inner surface 64 of the cover 60 to move the cover away from the instrument panel 22. At this point, the retainer sections 164 are subjected to a force greater than the threshold or predetermined removal force and deflect backward from the position illustrated in FIG. 3 to release the trailing surface portion 202 of the stud 122. The cover 60 can move in a direction away from the instrument panel 22 and the air bag 20 can extend through the deployment opening 24.

The cover 60 is installed in the recess 61 in the instrument panel 22 by aligning the four studs 122 that extend from the inner surface 64 of the cover 60 with the clips 120 in the respective mounting portions 80 of the instrument panel 22. The leading surface portion 200 of each stud 122 is moved through the mounting opening 86 in a corresponding mounting portion 80. The leading surface portion 200 of each stud 122 engages the retainer sections 164 of a corresponding clip 120 and centers the stud in the opening 162 in the clip by moving the clip within limits relative to the mounting portion 80, if needed. The leading surface portion 200 of the stud 122 deflects the retainer sections 164 of the clip 120 as the stud moves through the opening 162 in the clip to the position illustrated in FIG. 3. Once the transition portion 204 of each stud 122 passes the end surfaces 166 of the retainer sections 164 of the corresponding clip 120, the end surfaces engage the trailing surface portion 202 of the stud to hold the stud in the clip.

Upon the occurrence of an event indicating a vehicle collision above the predetermined magnitude and within a predetermined range of directions, an electrical signal is sent to the inflator 46 in the module 42. Upon receiving the signal, the inflator 46 directs inflation fluid into the air bag 20. As the inflation fluid fills the air bag 20, the air bag inflates from the stored condition and imparts a force against the inner surface 64 of the cover 60.

As the force against the inner surface 64 of the cover 60 increases to above the predetermined release force, the trailing surfaces 202 of the studs 122 deflect the corresponding retainer sections 164 of the clips 120 to release the studs from the clips. As the air bag 20 continues to inflate, the cover 60 moves away from the recess 61 in the instrument panel 22. The cover 60 is then directed away from the instrument panel 22 by the inflating air bag 20. The tether straps 100 restrict movement of the cover 60 to a location above the top of the air bag 20 as the air bag inflates.

Figure 8:
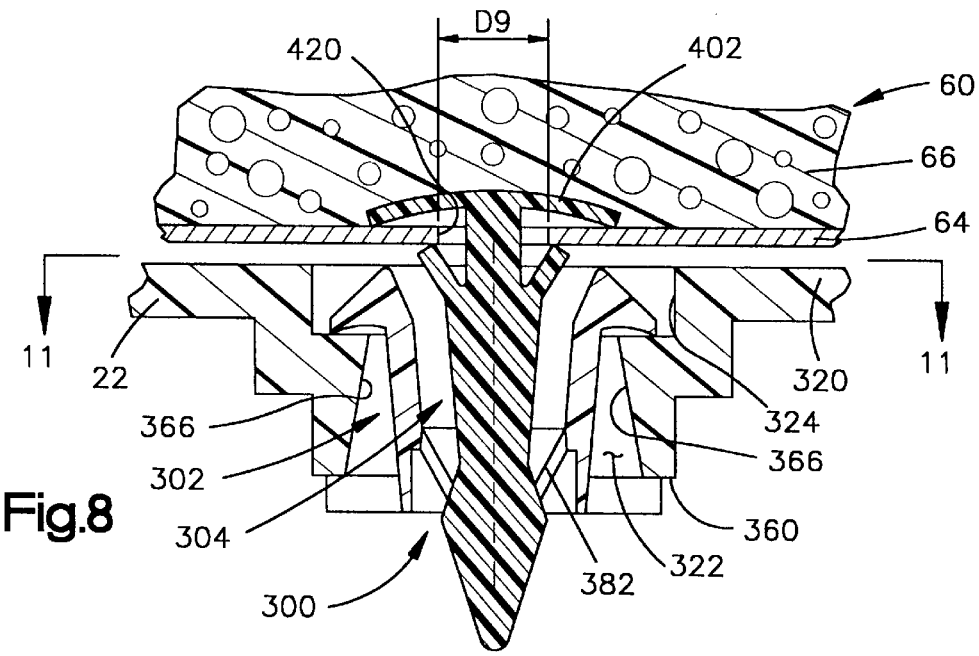
FIG. 8 is a view similar to FIG. 3, illustrating an attachment device according to another embodiment of the invention.

FIG. 8 illustrates a second embodiment of an attachment device 300. The attachment device 300 releasably attaches the cover 60 to the instrument panel 22. The attachment device 300 includes a clip 302 and a stud 304. The clip 302 is attached to a modified mounting portion 320 of the instrument panel 22. The stud 304 is attached to the cover 60 and is substantially not pivotable relative to the cover. Each mounting portion 320 receives a part of the attachment device 300.

Figure 11:
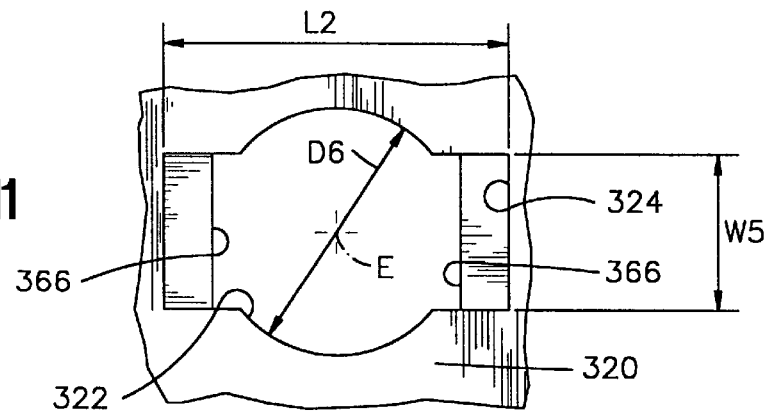
FIG. 11 is a plan view of a portion of the instrument panel of FIG. 8 with parts removed for clarity, taken approximately along the line 11—11 in FIG. 8.

A mounting opening 322 (FIG. 11) extends through the mounting portion 320 and has a center E. A recess 324 is formed in the mounting portion 320 on opposite sides of the mounting opening 322. The mounting opening 322 has a diameter D6 and the recess 324 has a width L2. It will be apparent that the clip 302 could be attached to the cover and the stud 304 could be attached to the instrument panel 22.

Figure 12:
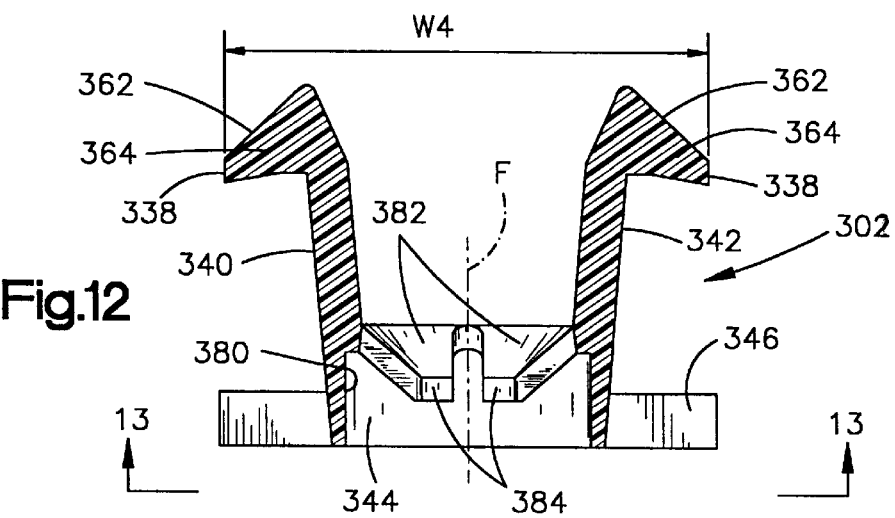
FIG. 12 is an enlarged sectional view of a clip of the attachment device of FIG. 8.

The clip 302 includes a pair of legs 340, 342 (FIG. 12). The legs 340, 342 are interconnected by a base 344. The clip 302 is molded from a plastic material which is relatively rigid but resiliently deflectable. A flange 346 extends around the base 344, as viewed in FIG. 12. The flange 346 may engage a lower surface 360 (FIG. 8) of the mounting portion 320 to limit upward movement of the clip 302 relative to the mounting portion 320 of the instrument panel 22, as viewed in FIG. 8.

Figure 13:
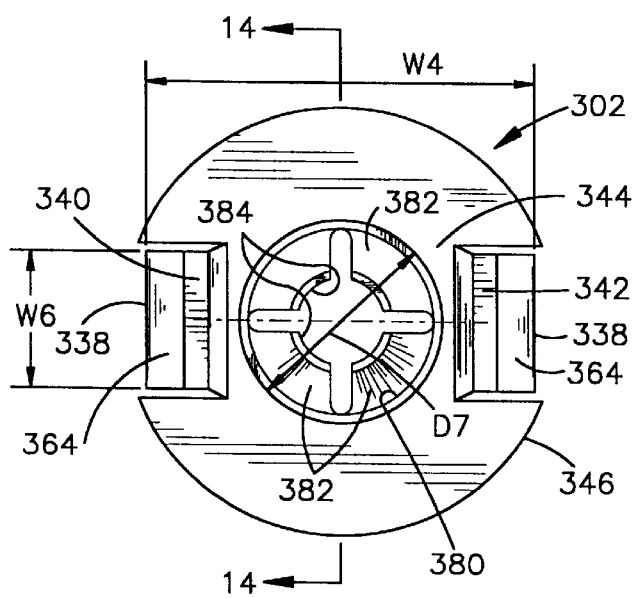
FIG. 13 is a plan view of the clip of FIG. 12, taken along the line 13—13 in FIG. 12.
Figure 14:
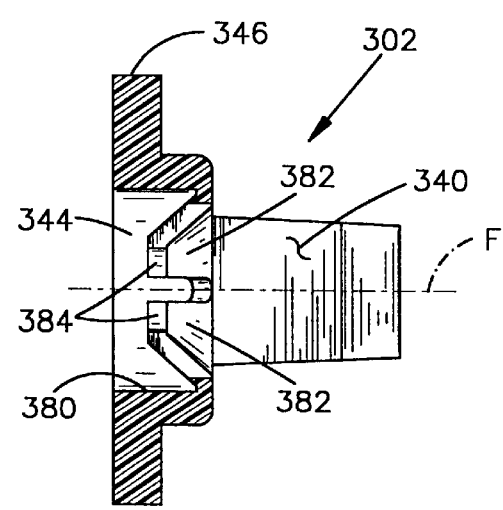
FIG. 14 is a sectional view of the clip of FIG. 13, taken approximately along the line 14—14 in FIG. 13.

The outermost surfaces 338 of the legs 340, 342 of the clip 302 are spaced apart a width W4, as viewed in FIG. 12, which is slightly less than the length L2 of the recess 324 in the mounting portion 320. Thus, the clip 302 can move relative to the mounting portion 320 in a direction between the opposite ends of the recess 324 in the mounting portion and compensate for misalignment of the cover 60 and the instrument panel 22. The recess 324 has a width W5 perpendicular to the length L2. The legs 340, 342 also have a width W6 (FIG. 13) which is less than the width W5 of the recess 324. Thus, the clip 302 can move relative to the mounting portion 320 in a direction along the width W5 of the recess 324.

The clip 302 includes tapered surfaces 362 on ends of the legs 340, 342. The tapered surfaces 362 face away from one another and force the legs 340, 342 toward one another when the clip 302 is installed on the mounting portion 320 of the instrument panel 22 by moving the clip upward into the mounting opening 322 of the mounting portion. The tapered surfaces 362 on the ends of the legs 340, 342 cam the legs inward on tapered surfaces 366 (FIG. 8) of the mounting opening 322 during movement of the clip 302 into the mounting opening. Projections 364 extend outward from the legs 340, 342 and enter the recess 324 in the mounting portion 320 to limit downward movement of the clip 302 relative to the mounting portion 320 of the instrument panel 22.

The base 344 of the clip 302 (FIG. 12) includes an opening 380. The opening 380 has a diameter D7 which is less than the diameter D6 of the mounting opening 322. The central axis F of the clip 302 is preferably coaxial with the center E of the mounting opening 322. The clip 302 has four retainer sections 382 which project into the opening 350, are resiliently deflectable, and have end surfaces 384. The retainer sections 382 extend at an acute angle in a downward direction relative to the axis F of the clip, as viewed in FIG. 12. The retainer sections 382 easily deflect downward, as viewed in FIG. 8, and resist upward deflection. The retainer sections 382 deflect downward when the stud 304 is moved downward through the clip 302.

The stud 304 is extendable through the opening 380 in the clip 302 and through the mounting opening 322 in the mounting portion 320 of the instrument panel 22, as illustrated in FIG. 8. The stud 304 cooperates with the clip 302 to releasably attach the cover 60 to the instrument panel 22.

The stud 304 (FIG. 9) is an elongate member molded from a relatively rigid plastic material. The stud 304 includes a body 400 and a head 402 located at the upper end of the body 400, as viewed in FIG. 9. The body 400 is slightly tapered inward as it extends downward along a longitudinal central axis G of the stud 122, as viewed in FIG. 9. The body 400 has a largest diameter D10 adjacent the head 402, which has a diameter D8 that is greater than the diameter D10.

The stud 304 projects through an opening 420 in the inner surface 64 of the cover 60. The opening 420 in the inner surface 64 has a diameter D9 which is less than the diameter D8 of the head 402 of the stud 304. The diameter D9 of the opening 420 may be greater than the largest diameter D10 of the body 400. The largest diameter D10 of the body 400 is less than the diameters D6 of the opening 322 in the mounting portion 320 and the diameter D7 of the opening 380 in the clip 302. The head 402 is resiliently deflectable and engages the inner surface 64 of the cover 60. The cushion portion 66 of the cover 60 is molded around the head 402 of the stud 304.

The stud 304 has deflectable arms 422 to hold the stud in a desired position in the cover 60. The arm 422 deflects inward when the stud 304 is moved through the opening 420 in the inner surface 64 of the cover 60. When the arms 422 pass through the opening 420, the arms spring outward to cooperate with the head 402 and hold the stud 304 in the cover 60.

Thus, the studs 304 are held in the desired position in the cover 60 and can be inserted into the clips 302 attached to the mounting portions 320 of the instrument panel 22. This is a relatively simple operation that reliably attaches the cover 60 to the instrument panel 22 and allows the cover to be released upon inflation of the air bag 20. The studs 304 and clips 302 also allow for misalignment of the studs relative to the opening 380 in the clips and the mounting openings 322 in the mounting portion 320 of the instrument panel 22.

Each stud 304 also includes a substantially nondeformable head 424 disposed at an end of the body 400 opposite the head 402. The head 424 includes a leading surface portion 426 and a trailing surface portion 428 connected at a transition portion 440. The transition portion 440 has a diameter D11 which is greater than the diameter D10 of the body 400 and less than the diameter D8 of the head 402. The diameter D11 is less than the diameters D6 and D7 of the mounting opening 322 in the mounting portion 320 and the opening 380 in the clip 302.

Figure 9:
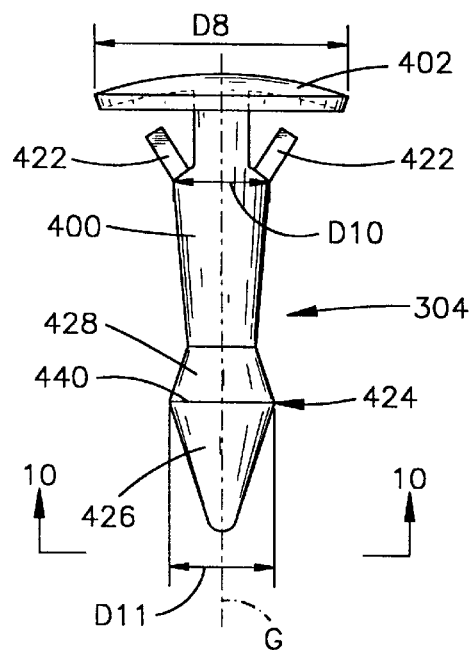
FIG. 9 is a side view of a stud of the attachment device of FIG. 8.
Figure 10:
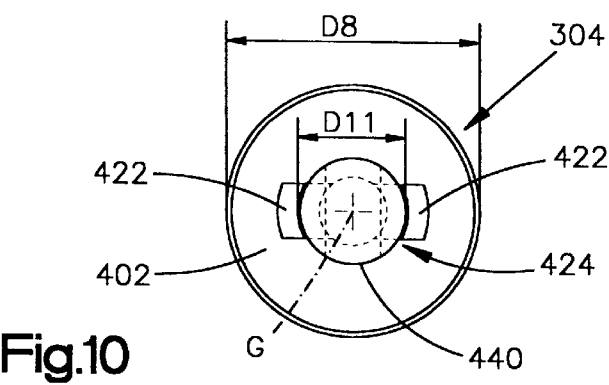
FIG. 10 is a bottom view of the stud of FIG. 9, taken along the line 10—10 in FIG. 9.

The leading surface portion 426 is tapered outward as it extends upward along the axis G, as viewed in FIG. 9, and forms a substantially conical end portion of the stud 304. As the stud 304 is moved through the clip 302 and the mounting portion 320 of the instrument panel 22, the leading surface portion 426 cams the retainer sections 382 of the clip 302 radially outward and downward, as viewed in FIG. 8. The substantially conical shape of the leading surface portion 426 also centers the stud 304 relative to the clip 302. The retainer sections 382 of the clip 302 continue to deflect outward and downward as the leading surface portion 426 passes through the opening 380 in the clip 302. When the transition portion 440 of the clip 302 passes the end surfaces 384 of the retainer sections 382, the retainer sections no longer deflect further outward and downward.

As the stud 304 is moved further through the opening 380 in the clip, the retainer sections 382 begin to deflect resiliently inward as the transition portion 440 passes the end surfaces 384. Once the transition portion 440 of the stud 302 moves past the end surfaces 384 of the retainer sections 382, the retainer sections resiliently deflect rearward and backward relative to the movement of the stud, to the position illustrated in FIG. 8.

The end surfaces 384 of the retainer sections 382 engage the trailing surface portion 428 of the stud 304 to hold the stud in the clip 302 and hold the cover 60 in the recess 61 in the instrument panel 22. The rigidity of the retainer sections 382 hold the cover 60 to the instrument panel 22. The clips 302 hold the studs 304 during normal operation of the vehicle.

Upon the application of a force by the studs 304 which exceeds a predetermined removal force, the retainer sections 382 of the clips 302 can be deflected to permit the studs to be removed from the clip and release the cover 60 from the instrument panel 22 during deployment of the air bag 20. When the air bag 20 is deployed, it exerts a force against the inner surface 64 of the cover 60 to move the cover away from the instrument panel 22. The retainer sections 382 of the clips 302 are subjected to a force greater than the threshold or predetermined removal force and deflect backward to release the trailing surface portions 428 of the studs 304. The cover 60 can move away from the instrument panel 22 and the air bag 20 extends through the deployment opening 24.

The cover 60 is installed in the recess 61 in the instrument panel 22 by aligning the four studs 304 that extend from the inner surface 64 with the clips 302 in the respective mounting portions 320 of the instrument panel 22. The leading surface portion 426 of each stud 304 is moved through the opening 322 in the corresponding mounting portion 320. The leading surface portion 426 of each stud 304 engages the retainer sections 382 of a corresponding clip 302 and centers the opening 380 in the clip by moving the clip within limits relative to the mounting portion 320, if needed. The leading surface portion 426 of the stud 304 deflects the retainer sections 382 of the clip 302 as the stud moves through the opening 380 in the clip to the position illustrated in FIG. 8. Once the transition portion 440 of each stud 304 passes the end surfaces 384 of the end sections 382 of the corresponding clip 302, the end surfaces engage the trailing surface portion 428 to hold the stud in the clip.

Upon the occurrence of an event indicating a vehicle collision above the predetermined magnitude and within a predetermined range of directions, an electrical signal is sent to the inflator 46 in module 42. Upon receiving the signal, the inflator 46 directs inflation fluid into the air bag 20. As the inflation fluid fills the air bag 20, the air bag inflates from the stored condition and imparts a force against the inner surface 64 of the cover 60.

As the force against the inner surface 64 of the cover 60 increases to above the predetermined force, the trailing surface portions 428 of the studs 304 deflect the retainer sections 384 in each clip 302 to release the stud from the clip. As the air bag 20 continues to inflate, the cover 60 moves away from the instrument panel 22. The cover 60 is then directed away from the instrument panel 22 by the inflating air bag 20.

From the above description of the invention, those skilled in the art will perceive improvements, changes and modifications. It should be apparent that the attachment devices 82, 300 can be used anywhere that releasable attachment of a part to another part is desired. For example, the attachment devices 82, 300 may be used to releasably attach an air bag cover to a vehicle steering wheel, a vehicle door, a vehicle side panel or a vehicle seat. Such improvements, changes and modifications within the skill of the art are intended to be covered by the appended claims.

Having described the invention, the following is claimed:

1. An apparatus for helping to protect a vehicle occupant, said apparatus comprising:

an inflatable vehicle occupant protection device mountable in a vehicle, said protection device being deployable, upon inflation, through a deployment opening in a vehicle part;

a cover for closing the deployment opening in the vehicle part prior to deployment of said protection device, said cover being movable away from the vehicle part upon deployment of said protection device; and attachment means for releasably attaching said cover to the vehicle part, said attachment means comprising:

a clip attachable to one of said cover and the vehicle part, the one of said cover and the vehicle part having a mounting opening and a recess adjacent the mounting opening, said clip comprising a retaining portion biased to be received in the recess and inhibit removal of said clip from the one of said cover and the vehicle part and an opening for alignment with the mounting opening, said clip further including a resiliently deflectable portion; and a stud being non-pivotally fixed to the other of the vehicle part and said cover, said stud being releasably connectable with said clip, said stud comprising a body extendable through the opening in said clip and the mounting opening;

said clip being movable relative to the mounting opening in the one of said cover and the vehicle part to compensate for relative misalignment among the opening in said clip, the mounting opening and said stud during attachment of said cover to the vehicle part.

2. The apparatus of claim 1 wherein said clip is attached to the vehicle part and said stud is fixed to said cover.

3. The apparatus of claim 1 wherein said stud further includes means at one end of said body attachable to the other of the vehicle part and said cover, and a substantially nondeformable enlarged head at an opposite end of said body with a leading surface for deflecting said resiliently deflectable portion of said clip during movement of said head through said resiliently deflectable portion and a trailing surface for engaging said resiliently deflectable portion after said leading surface moves beyond said resiliently deflectable portion to retain said stud within said clip until deployment of said protection device.

4. The apparatus of claim 3 wherein said stud has a longitudinal central axis and circular cross-sections in a plane normal to the axis, the diameters of the circular cross-sections gradually varying at locations along said stud between a maximum diameter and a minimum diameter.

5. The apparatus of claim 1 wherein said resiliently deflectable portion of said clip is located within the opening in said clip.

6. The apparatus of claim 1 wherein said clip further includes a pair of substantially parallel legs connected by a base to form a substantially U-shaped member, said legs of said clip being adapted to be disposed on opposite sides of the one of said cover and the vehicle part, each of said legs having an opening through which said stud can extend, said base being received in a slot located adjacent said mounting opening in the one of said cover and the vehicle part having said mounting opening.

7. The apparatus of claim 6 wherein each of said legs include a tapered end surface facing the other tapered end surface for guiding said clip on the one of said cover and the vehicle part and deflecting each leg away from the other as said clip is being installed on said one of said cover and the vehicle part.

8. The apparatus of claim 1 wherein said resiliently deflectable portion of said clip is disposed at an acute angle to a longitudinal central axis of the opening in said clip, said portion deflecting upon the application of a first force to allow said stud to move in one direction through the opening in said clip and deflect upon the application of a second force greater than the first force to allow said stud to move in an opposite direction through the opening in said clip upon deployment of said protection device.

9. The apparatus of claim 1 wherein said retaining portion of said clip comprises a deflectable section at one end and a flange at an opposite end, said flange engaging a surface of the one of said cover and said vehicle part when an end of said deflectable section is received in the recess adjacent the mounting opening.

10. The apparatus of claim 1 wherein said stud further includes resiliently deflectable arms which deflect inward to allow movement of said stud in one direction through an opening in said one of said cover and the vehicle part and expand outward to inhibit movement of said stud in an opposite direction.

11. The apparatus of claim 10 wherein said stud further includes a resiliently deflectable head.

12. The apparatus of claim 1 wherein the opening in said clip and the mounting opening in the one of said cover and the vehicle part have dimensions which are greater than a corresponding dimension of said body of said stud in a plane extending perpendicular to a longitudinal axis of said stud.

13. An apparatus for helping to protect a vehicle occupant, said apparatus comprising:

an inflatable vehicle occupant protection device mountable in a vehicle, said protection device being deployable through a deployment opening in a vehicle part which has a mounting opening and a recess adjacent the mounting opening;

a cover for closing the deployment opening in the vehicle part prior to deployment of said protection device, said cover being movable away from the vehicle part upon deployment of said protection device;

attachment means for releasably attaching said cover to the vehicle part, said attachment means comprising:

a clip attachable to the vehicle part, said clip comprising a projection for receipt in the recess and an opening for alignment with the mounting opening, said clip further including a resiliently deflectable portion; and a stud being non-pivotally fixed to said cover, said stud being releasably connectable with said clip, said stud comprising a body extendable through the opening in said clip and the mounting opening, means at one end of said body attachable to said cover, and a substantially nondeformable enlarged head at an opposite end of said body with a leading surface for deflecting said resiliently deflectable portion of said clip during movement through said clip and a trailing surface for engaging an end surface of said resiliently deflectable portion after said leading surface moves beyond said resiliently deflectable portion to retain said stud within said clip until said protection device is deployed;

said clip being movable relative to the mounting opening in the vehicle part to compensate for relative misalignment in a direction normal to a longitudinal axis of said stud among the opening in said clip, the mounting opening and said stud, the opening in said clip and the mounting opening in the vehicle part having diameters which are greater than the largest diameter of said body and said enlarged head of said stud in a plane extending perpendicular to the axis of said stud.

14. The apparatus of claim 13 wherein said clip further includes a pair of substantially parallel legs connected by a base to form a substantially U-shaped member, each of said legs having an opening through which said stud can extend, said legs of said clip being adapted to be disposed on opposite sides of the vehicle part.

15. The apparatus of claim 14 wherein said resiliently deflectable portion of said clip is located within one of the openings in said legs of said clip.

16. The apparatus of claim 13 wherein said stud has a longitudinal central axis and circular cross-sections in a plane normal to the axis, the diameters of cross-sections gradually varying at locations along said stud.

* * * * *